United States Patent [19]
Amos et al.

[11] Patent Number: 5,172,475
[45] Date of Patent: Dec. 22, 1992

[54] METHOD FOR REPAIRING A ROTOR

[75] Inventors: Dennis R. Amos, Rock Hill, S.C.; Robert E. Clark, Orlando, Fla.

[73] Assignee: Westinghouse Electric Corp., Pittsburgh, Pa.

[21] Appl. No.: 801,137

[22] Filed: Dec. 9, 1991

[51] Int. Cl.[5] .................................................. B21K 3/04
[52] U.S. Cl. ................................. 29/889.1; 29/402.08; 228/119
[58] Field of Search .................. 29/889.1, 889, 402.08, 29/402.13, 402.18; 228/119

[56] References Cited

U.S. PATENT DOCUMENTS

| | | |
|---|---|---|
| 1,379,975 | 5/1921 | Golden . |
| 4,208,003 | 6/1980 | Meylan . |
| 4,455,732 | 6/1984 | Shiets . |
| 4,467,955 | 8/1984 | Maupin, Jr. . |
| 4,581,816 | 4/1986 | Klufas et al. . |
| 4,633,554 | 1/1987 | Clark et al. . |
| 4,819,313 | 4/1989 | Dadhich ............................ 29/889.1 |
| 4,857,693 | 8/1989 | Rump . |
| 4,893,388 | 1/1990 | Amos et al. ....................... 29/889.2 |
| 4,897,519 | 1/1990 | Clark et al. ....................... 29/889.1 |
| 4,958,431 | 9/1990 | Clark et al. ....................... 29/889.1 |
| 4,962,586 | 10/1990 | Clark et al. ....................... 29/889.2 |
| 5,092,942 | 3/1992 | Fraser et al. ..................... 29/402.18 |

OTHER PUBLICATIONS

John W. Stanton and L. Doug Smith, "Diagnosis and Repair of a Cracked Double Flow LP Rotor at Florida Power & Light Company's Port Everglades Unit 2", presented May 28, 1987 in New Orleans, La.

J. N. Clark, D. Long, and K. D. Ryan, *Workshop on Weld Repair of High-Pressure and Intermediate-Pressure Turbine Rotors for Life Extension*, "Welding Aspects of the Repair of a 350 MW IP Rotor", presented Dec. 1-2, 1987 in Palo Alto, Calif.

*Primary Examiner*—Irene Cuda
*Attorney, Agent, or Firm*—Aileen C. Addessi

[57] ABSTRACT

A method for repairing a rotor includes severing the rotor into two or more rotor segments. After removing a portion of material including the crack from the rotor, weld metal is deposited onto the rotor until the removed portion is replaced with weld metal. A built-up portion is welded onto a surface positioned adjacent a bore of each of the rotor segments. One of the built-up portions is machined into a female spigot and the other build-up portion is machined into a male spigot for engagement of the rotor segments. The female and the male spigots are engaged for alignment of the rotor segments. The rotor segments are welded together with weld metal, which is deposited in a welding groove formed between the rotor segments and the spigots. After the rotor segments are joined together, the male spigot, the female spigot, and a portion of the weld metal positioned near the root fusion area are removed to restore the bore of the rotor to its original diameter.

14 Claims, 3 Drawing Sheets

METHOD FOR REPAIRING A ROTOR

BACKGROUND OF THE INVENTION

1. Field of the Invention

This invention relates to a method for aligning and joining a plurality of members each having a bore therethrough and, more particularly, to a method for repairing a rotor.

2. Description of the Prior Art

Rotors, such as steam turbine rotors or generator rotors, may develop cracks. A crack may propagate to the bore of the rotor, which can be damaging.

To repair the rotor, the rotor is severed near the point of the crack into at least two rotor segments. The portion of the rotor having the crack is removed. The stub end, which is removed from the rotor body, is replaced with a new stub end, which is either bolted or welded onto the rotor body. However, use of the replacement stub end requires either that a replacement stub end remain in inventory, which results in additional costs, or that a replacement stub end be ordered, which results in downtime awaiting the arrival of the new part and additional costs in purchasing the part.

Therefore, what is needed is a method of repairing a rotor which joins the original stub end to the rotor body, thereby reducing downtime and inventory and material costs.

SUMMARY OF THE INVENTION

A method for repairing a rotor includes severing the rotor, at a position which is in close proximity to a crack, into at least two pieces. A portion of the material including the crack is removed from one of the pieces. The removed portion is replaced with weld metal.

A built-up portion is welded onto a surface adjacent the bore of each of the pieces. One of the built-up portions is machined into a first mating connection and another of the built-up portions is machined into a second mating connection for engagement of the pieces.

The pieces are positioned adjacent to each other and the first and said second mating connections are engaged for alignment of the pieces. The engaged pieces are welded together with weld metal. After the welding process is completed, the mating connections may be removed from the rotor.

By welding together the original pieces, instead of welding a new replacement piece onto one of the original pieces, downtime of the equipment and costs are reduced.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides a method for repairing a tubular member, such as a rotor, having a crack by severing the member to remove a portion of the member containing the crack and welding the two segments of the severed member together.

Figure 1:
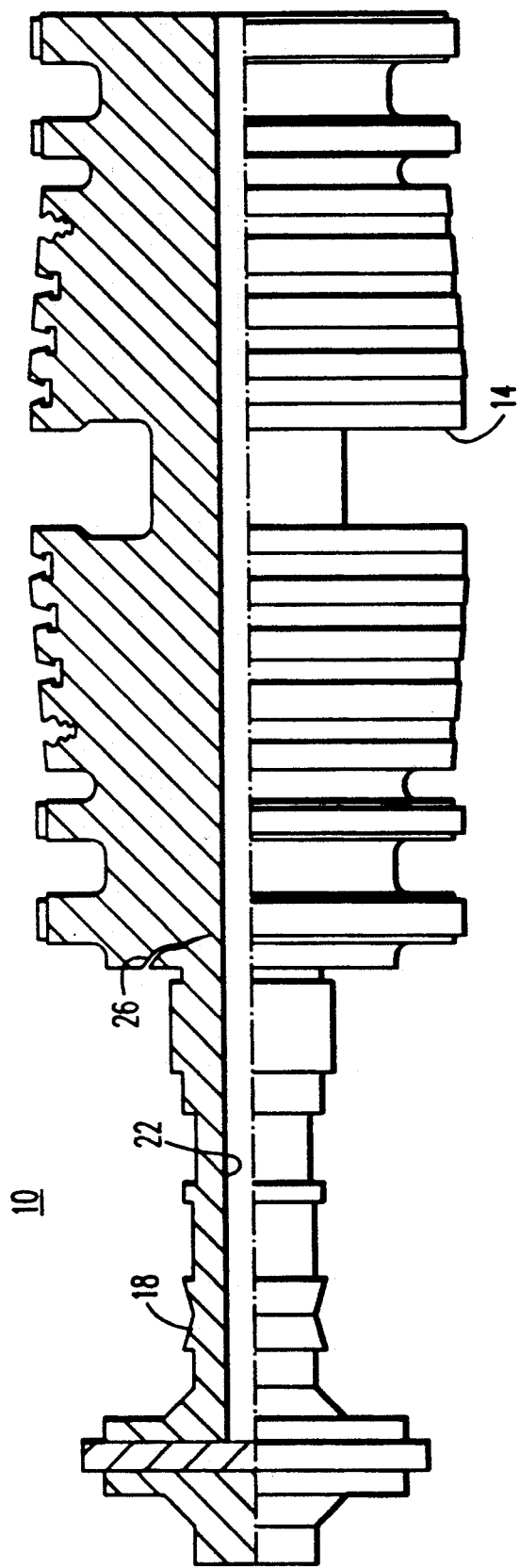
FIG. 1 is a partial cross-sectional view of a rotor having a crack.
Figure 2:
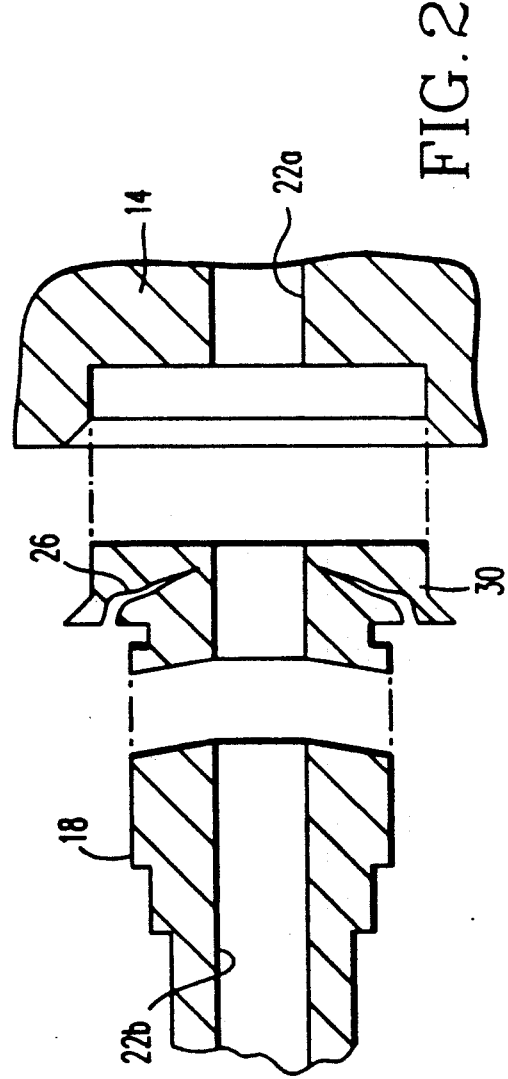
FIG. 2 is a cross-sectional view of the rotor severed into a stub end and a rotor body.

Referring to FIGS. 1 and 2, rotor 10 includes a rotor body 14 and a stub end 18. The rotor 10 has a bore 22. A crack 26, by way of example, is positioned between the rotor body 14 and the stub end 18. Initially, the growth of the crack 26 is axial and then the growth of the crack 26 turns inward toward the bore 22.

To repair the cracked rotor 10, the rotor 10 is severed into at least two pieces, such as the stub end 18 and the rotor body 14. The stub end 18 is removed from the rotor body 14 for providing accessibility to the entire crack 26 positioned within the rotor body 14 for failure analysis and other testing of the crack 26 and of the rotor 10 and for restoration of the rotor 10 by welding.

Because a crack may grow erratically around the diameter of the rotor 10, the rotor body 14 is inspected, such as by ultrasonic inspection, to determine the depth and angles of machining required to remove the crack 26. After determining the location of the crack, a portion 30 of the rotor 10 containing the crack 26 is removed, such as by machining, with the crack 26 intact. The complete crack 26 must be removed while removing a minimum amount of the rotor body 14. The crack may be further analyzed for determining the cause of the failure. The rotor body 14 and the stub end 18 are inspected, such as by ultrasonic inspection and magnetic particle inspection, to verify the removal of the entire crack 26 from the rotor body 14 and the stub end 18.

Figure 3:
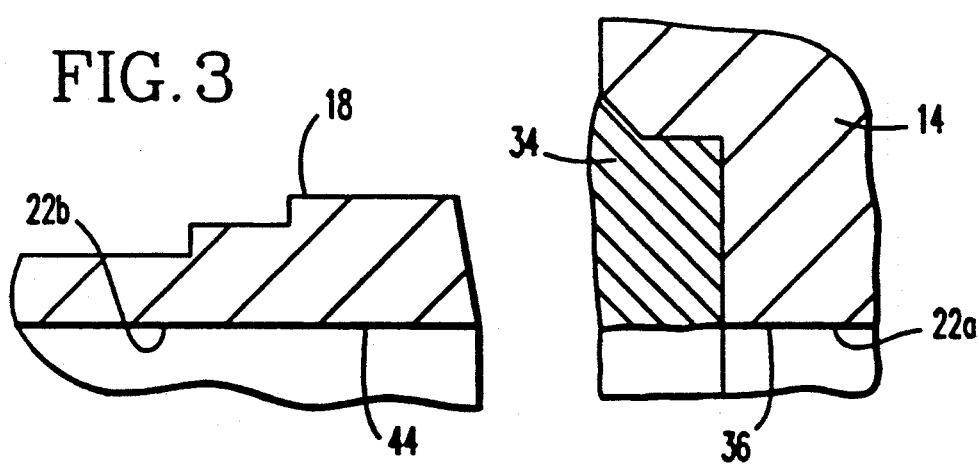
FIG. 3 is a cross-sectional view of the stub end and the rotor body.

Referring to FIGS. 2 and 3, the portion 30 which was removed from the rotor body 14 is replaced with a weld metal to provide a portion 34. Additional welding may be used to build up enough stock to machine a welding preparation, which is used for providing a surface to weld together the rotor body 14 and the stub end 18. Also, additional weld metal may be used to alter the original design by providing a thicker section and larger diameter portion 34, commonly referred to as upgrading the design, to alleviate fatigue cracking during future operation of the rotor 10.

Figure 4:
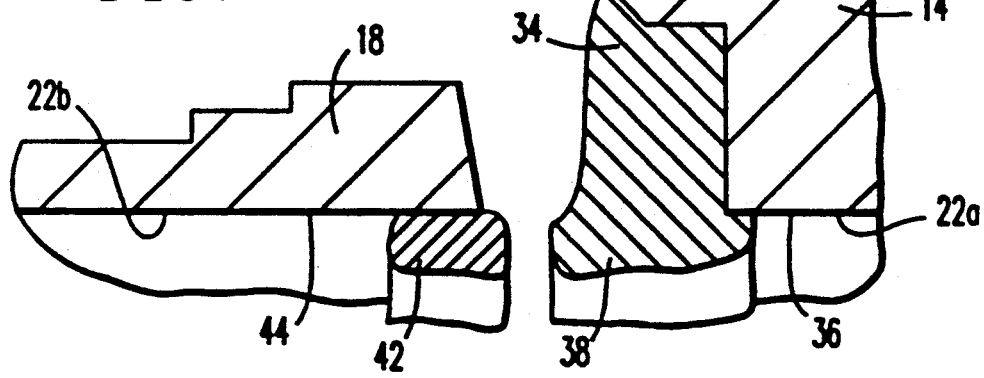
FIG. 4 is a cross-sectional view of the stub end and the rotor body having a built-up portion.

Referring to FIGS. 3 and 4, additional welding is used to deposit weld metal onto a surface 36 positioned adjacent the bore 22a of the rotor body 14 for providing a built-up portion 38. A built-up portion 42 of weld metal is welded onto a surface 44 positioned adjacent the bore 22b of the stub end 18 of the rotor 10. The built-up portions 38 and 42 are positioned within and extend below the original diameter of the bores 22a and 22b.

Figure 5:
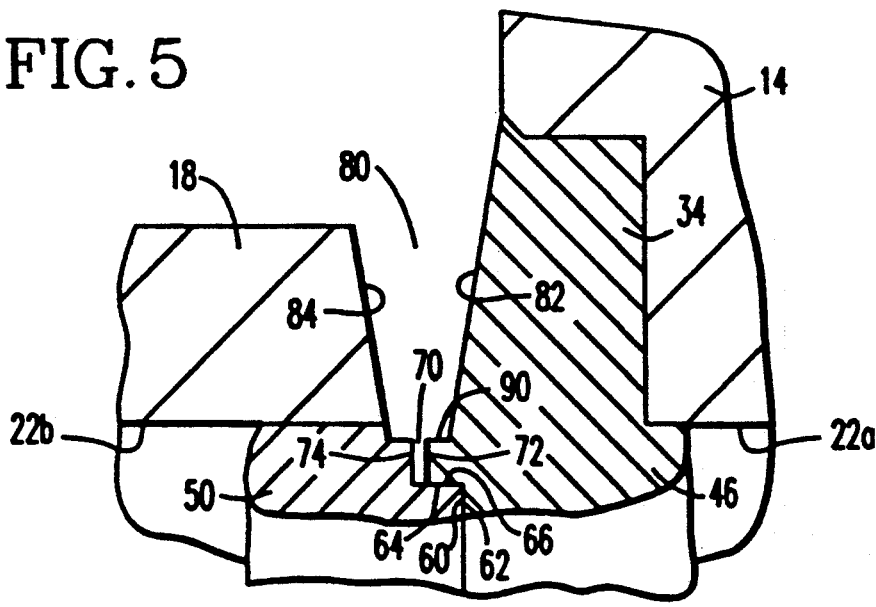
FIG. 5 is a cross-sectional view of a male and female spigot.

Referring to FIGS. 4 and 5, the build-up portion 38 and the build-up portion 42 are machined to form a mating connection, such as a spigot-type fit or shiplap, between the rotor body 14 and the stub end 18. As an example, the build-up portion 38 of the rotor body 14 is machined into a first mating connection or a male spigot 46 and the build-up portion 42 of the stub end 18 is machined into a second mating connection or a female spigot 50. A spigot-type fit is a precise fit that ensures accurate alignment, both axially and radially. Utilization of the mating connection ensures that the bore 22b of the stub end 18 is centered relative to the bore 22a of the rotor body 14.

When the male spigot 46 and the female spigot 50 are engaged, a first surface 60 of the male spigot 46 contacts and is mateable with a first surface 62 of the female spigot 50 for controlling axial alignment of the rotor body 14 and the stub end 18. A second surface 64 of the male spigot 46 contacts and is mateable with a second surface 66 of the female spigot 50 for controlling center alignment or concentricity of the rotor body 14 and the stub end 18. The engagement of the first surfaces 60 and 62 and the second surfaces 64 and 66 maintains the alignment of the rotor body 14 and the stub end 18 during the welding process. Also, the mating surfaces eliminate the need for flooding the bores 22a and 22b with inert gas, which shields the underside of the weld during the welding process.

A gap 70 exists between a third surface 72 of the male spigot 46 and a third surface 74 of the female spigot 50 for allowing movement of the mating connection to compensate for expansion and contraction of the rotor body 14 and the stub end 18 during the welding process. The rotor body 14 and the stub end 18 may expand during preheating and contract after the liquid weld metal solidifies. The use of the gap 70 reduces the possibility of root cracking during welding and eliminates the additional cost of using a device designed to collapse to prevent root cracking.

When the rotor body 14 and the stub end 18 are positioned adjacent to one another and mateably engaged, a welding groove 80 is defined by an end 82 of the rotor body 14, an opposing end 84 of the stub end 18, and the mating connection of the male spigot 46 and the female spigot 50. The welding groove 80 is a narrow groove, which requires less welding than a groove, thereby decreasing downtime, costs, and distortion.

The spigot-type fit of the mating connection is designed having the desired root opening for obtaining a successful root fusion, thereby eliminating the need to use any specialized fixtures to establish the proper distance for the root opening during assembly and alignment, and eliminating the necessity of removing any external devices used to set the root opening for allowing access for a welding torch.

Figure 6:
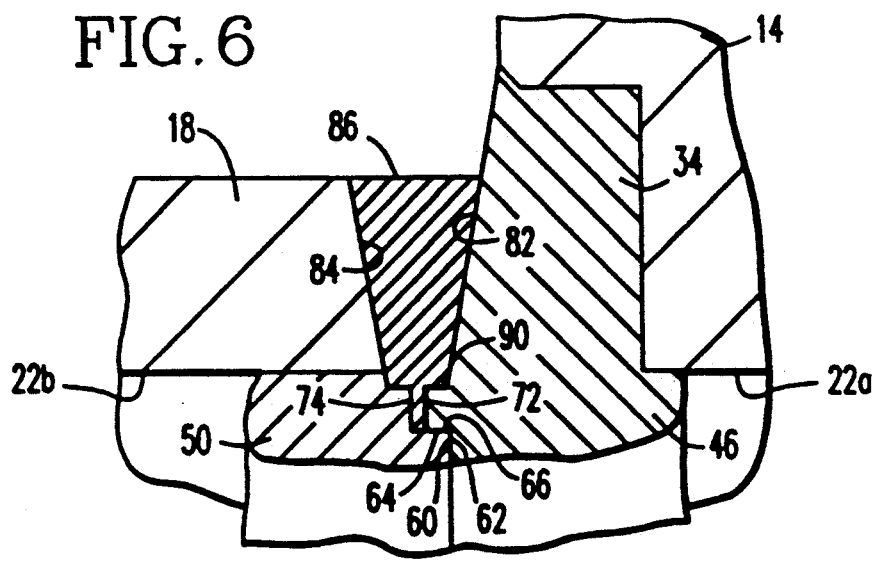
FIG. 6 is a cross-sectional view of weld metal deposited within a welding groove positioned between the stub end and the rotor body.

Referring to FIGS. 5 and 6, after inspecting the alignment to verify the desired concentricity and parallelism of the rotor 10, a weld metal is deposited in the welding narrow groove 80 to form a portion 86, which joins the rotor body 14 and the stub end 18 together. A plurality of weld torches (not shown) may be used to weld the rotor body 14 and the stub end 18 together. Preferably, the weld torches are positioned equidistant from each other around the joint diameter for simultaneously welding the stub end 18 and the rotor body 14 together. The heat input from each arc is substantially the same for each welding torch for preventing distortion in any direction from the rotor body 14 or the stub end 18. The weld torches may move circumferentially around the rotor 10 or the rotor 10 may rotate while the weld torches remain stationary, for welding the circumference of the rotor 10.

Preferably, initially two weld torches positioned opposite to one another are used to deposit the weld metal in the gap 70 to hold the rotor body 14 and the stub end 18 in alignment. By using weld metal at the root 90, in lieu of the base metal of the rotor 10, the weld metal is more weldable, is more controllable for out of position welding, and is resistant to solidification cracking.

The spigot-type fit of the mating connection is formed to have a large cross section to substantially eliminate the possibility of burn through during the welding process. Penetration to the root 90 is not required because the root 90 is positioned below the original bore 22 and will be removed to restore the bore 22 of the rotor 10 to its original diameter.

After sufficient welding to hold the rotor body 14 and the stub end 18 in axial and radial alignment, a single weld torch is used to deposit the remaining required amount of weld metal for welding together the stub end 18 and the rotor body 14.

Figure 7:
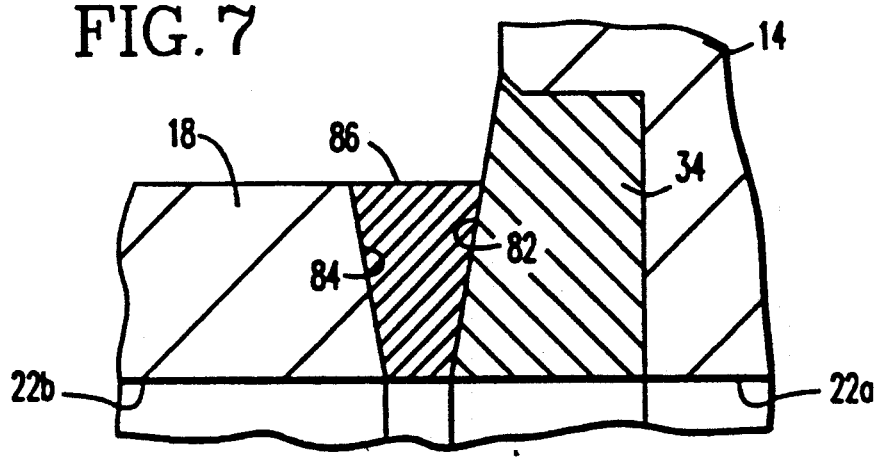
FIG. 7 is a cross-sectional view the joined stub end and rotor body having the spigot-type fit removed.

Referring to FIGS. 6 and 7, the male spigot 46, the female spigot 50, the root 90, and a portion of the weld metal positioned adjacent to the root 90 and the mating connection is removed, such as by machining, for restoring the diameter of the bore 22 of the rotor 10 to its original diameter. The inside of the rotor 10 is bored along the rotor centerline out to a diameter to a position of clean weld metal, beyond the questionable quality weld located at the root fusion area. The bore surface is nondestructively examined to insure bore surface and sub-surface quality.

Utilization of the original stub end 18 to perform the repair of the rotor 10 instead of discarding the stub end 18 and purchasing a replacement stub end saves material and reduces the cost of the repair. Also, the repair process can be performed on site.

The manufacturing cycle time is reduced by using the original stub end 18 as compared to ordering a replacement part in the event a replacement part is not in inventory.

Use of the spigot fit eliminates the need to use gauges and fixtures to establish the proper root opening and eliminated the need to use shrunk-fit parts, such as sleeves, to axially and radially align the stub end and the rotor body.

By forming the root 90 within the bore 22 of the rotor 10 and requiring the root 90 to be removed, the use of collapsing devices to prevent root cracking, the use of inspection holes and subsequent plug welding to inspect the root, and the use of the technique of bottle-boring are eliminated.

Figure 8:
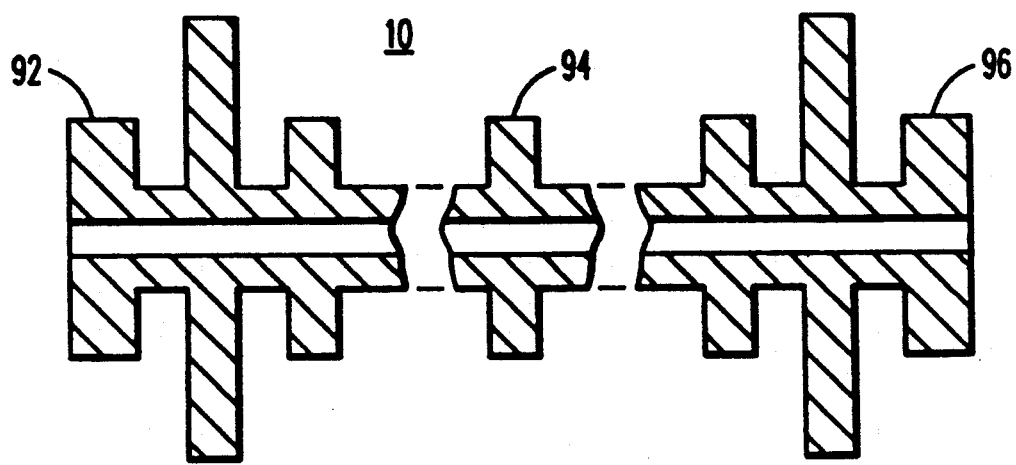
FIG. 8 is a cross-sectional view of the rotor severed at two locations.

Referring to FIG. 8, the rotor 10 may be severed at a plurality of locations into several pieces. At each location, the previously described steps of repairing the rotor 10 are performed to join together the pieces of the rotor 10. As an example, the rotor 10 may be severed at two locations, producing a first piece 92, a second piece 94, and a third piece 96. The previously described method of repairing the rotor 10 is performed at the two locations at which the rotor 10 was severed.

Therefore, the invention provides a method for repairing a rotor having a crack, which utilizes a mating connection to join the original stub end and the original rotor body together.

We claim:

1. A method for repairing a rotor, comprising the steps of:

severing said rotor, at a position which is in close proximity to a crack, into at least two pieces, said pieces having a bore therethrough;

removing a portion of material including said crack from one of said pieces;

replacing said removed portion of material with weld metal;

welding a built-up portion onto a surface adjacent said bore of each of said pieces;

machining one of said built-up portions into a first mating connection and another of said built-up portions into a second mating connection for engagement of said pieces;

positioning one of said pieces adjacent to another of said pieces engaging said first and said second mating connections for alignment of said pieces; and welding said pieces together with weld metal.

2. The method according to claim 1, further comprising the step of removing said mating connections.

3. The method according to claim 1, wherein the step of welding said pieces together comprises depositing weld metal in a welding groove, said welding groove being positioned between said pieces and said mating connections upon engagement of said pieces.

4. The method according to claim 2, wherein the step of removing said mating connections comprises boring out said mating connections and at least a portion of said weld metal.

5. The method according to claim 1, wherein the step of engaging said pieces comprises contacting at least one surface of said mating connection against at least one surface of another mating connection for controlling alignment of said pieces.

6. The method according to claim 1, wherein the step of engaging said pieces further comprises providing a gap between at least one surface of said first mating connection and at least one surface of said second mating connection for maintaining alignment of said pieces of said rotor during expansion or contraction of said rotor during welding of said rotor.

7. The method according to claim 6, wherein the step of welding said pieces further comprises depositing weld metal in said gap for retaining alignment of said pieces.

8. A method for repairing a rotor having a stub end and a rotor body, comprising the steps of:

severing said stub end of said rotor from said rotor body;

removing a portion of material including a crack from said rotor body;

depositing a weld metal on said rotor body until said removed portion of material is replaced with said weld metal;

welding a built-up portion onto a surface adjacent a bore of said stub end and onto a surface adjacent a bore of said rotor body;

machining one of said built-up portions into a female spigot and another of said built-up portions into a male spigot for engagement of said rotor body and said stub end;

positioning said rotor body and said stub end adjacent to each another and engaging said female and said male spigots for alignment of said stub end and said rotor body; and welding said stub end and said rotor body together with a weld metal.

9. The method according to claim 8, further comprising the step of removing said male and said female spigots.

10. The method according to claim 9, wherein the step of removing said spigots further comprises removing a portion of said weld metal utilized to weld said stub end and said rotor body together until the diameter of said bore is restored to an original diameter of said bore.

11. The method according to claim 8, wherein the step of engaging said female and said male spigots further comprises providing a gap between at least one surface of said female spigot and at least one surface of said male spigot for maintaining alignment of said pieces of said rotor during expansion or contraction of said rotor during welding of said rotor.

12. A method for repairing a member having a bore therethrough, comprising the steps of:

severing said member, at a position which is in close proximity to a crack, into at least two pieces;

removing a portion of material including said crack from at least one of said pieces;

replacing said removed portion of material with weld metal;

welding a built-up portion onto a surface adjacent a bore of each of said pieces;

machining each built-up portion into a mating connection for engagement of said pieces;

engaging said mating connections for alignment of said pieces; and welding said pieces together.

13. The method according to claim 12, further comprising the step of removing said mating connections.

14. The method according to claim 12, further comprising severing said member at a plurality of locations.

* * * * *

UNITED STATES PATENT AND TRADEMARK OFFICE
CERTIFICATE OF CORRECTION

PATENT NO. : 5,172,475
DATED : December 22, 1992
INVENTOR(S) : Dennis R. Amos, Rock Hill, S.C.
Robert E. Clark, Orlando, Fla.

It is certified that error appears in the above-indentified patent and that said Letters Patent is hereby corrected as shown below:

On the title page, item [22], delete "Dec. 9, 1991" and substitute --Dec. 2, 1991--.

Signed and Sealed this

Twenty-seventh Day of December, 1994

Attest:

BRUCE LEHMAN

Attesting Officer          Commissioner of Patents and Trademarks